Figure 1:
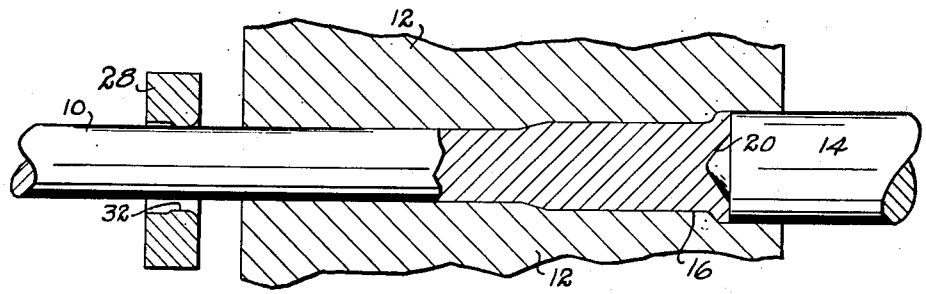

Sept. 15, 1936. W. W. CRILEY 2,054,244
METHOD OF EXTRUDING SOCKET FORGINGS
Original Filed Dec. 21, 1933  3 Sheets-Sheet 1

Sept. 15, 1936.   W. W. CRILEY   2,054,244
METHOD OF EXTRUDING SOCKET FORGINGS
Original Filed Dec. 21, 1933   3 Sheets-Sheet 2

INVENTOR
William W. Criley,
BY
Justin W. Macklin,
ATTORNEY

Patented Sept. 15, 1936

2,054,244

UNITED STATES PATENT OFFICE 2,054,244

METHOD OF EXTRUDING SOCKET FORGINGS

William W. Criley, Cleveland, Ohio

Refiled for abandoned application Serial No. 703,434, December 21, 1933. This application July 10, 1936, Serial No. 89,966

5 Claims. (Cl. 207—10)

This application is a substitute for application Serial No. 703,434, filed Dec. 21, 1933. This invention relates to a method of extruding metal, and in particular to a method of producing long thin-walled socket forgings from short thick-walled socket shaped blanks by extruding the metal of the latter.

It is a general object of this invention to provide a method for extruding metal into long thin-walled socket forgings from short thick-walled socket shaped blanks with simple apparatus and in which the thin wall socket is formed progressively outward from the parent portion of the blank.

It is another object to provide a method of forming such thin wall socket forgings in which the metal is caused to flow toward the parent metal of the stock in a direction coaxial with the formation of the socket, by the application of force or pressure on the portion of the blank to be extruded, and by beginning such extrusion adjacent the parent metal thus causing the parent metal to move away from the bulk of the metal being extruded.

Another object is to provide a method in which thin-walled socket forgings of uniform and definite length of either the straight or tapered type may be produced by production methods. It is yet a further object to provide a method by which such sockets may be formed free of fins along their length.

Other and more specific objects include an extruding process which provides for the formation of thin-walled socket forgings terminating in flanged elements.

Further objects will be apparent as my invention is more fully disclosed in connection with the attached drawings in which:

Figs. 1 to 5 illustrate one method of carrying out my extruding process, while Figs. 6 to 9 illustrate other methods.

Referring now to the drawings, a blank having a parent stock portion 10 may be upset in suitable gripper dies 12 by an upsetting tool 14 to form an enlarged end portion 16 having a cavity 20. A second operation may then be performed upon the blank in another die cavity 18 comprising internally expanding the blank with a suitable tool 24 to form a relatively thick-walled tubular hollow section 22. During these first two operations a seamless extrusion ring 28 may be freely disposed on the blank, and for a third operation this ring may be interfitted with a coacting recess in the dies, as indicated in dotted lines 30 in Figs. 2 and 3. In the two former operations the blank is gripped between gripper dies whereas in the third operation the blank is freely movable in the dies, but is first positioned in the die so that the internally expanded portion of the blank is to the right of the extrusion ring 28. The extrusion ring has an aperture 32 therein substantially smaller than the perimeter of the enlarged portion of the blank and of a desired perimeter and shape for the finished socket forging.

The same tool 24 with the cylindrical portion 26 may be used in the third operation as used in the second. Preferably, however, a tapered nose portion 27 of the tool 25 is used, and enters the cavity 34 of the blank and applies force or pressure exerted on the end of the relatively thick wall 22 through the shoulder 36 as the tool 24 advances in the metal. The relatively thick wall 22 is forced through the aperture 32 concentric of the forming tool, causing the metal to be extruded axially of the tool from a bulk portion to the right of the aperture 32 of the extrusion ring 28, or a like opening in the die.

In this step it is to be noted that the socket is formed beginning from adjacent the parent stock and thence axially and outwardly therefrom. The metal is thus caused to flow along the nose of the forming tool pushing the parent stock out of the die. By making the nose 27 of the tool tapered the friction between extruded metal and tool is reduced, and the wall thickness of the extruded socket varies, being thickest at the base and thinnest at the opening in proportion to the variation in space between the nose and the aperture 32, as the tool advances.

In this third operation the depth of the socket is dependent upon the bulk of the metal in the thick wall portion of the blank, which may be made suitable and adequate for the operation. A collar 36 may be left on the end of the socket and this may be severed in the manner shown in the fourth step in Fig. 4. The thickness of the collar may be varied to maintain the same length of sockets. The length of the sockets may vary for the following reasons:—temperature, slight variation in volume of stock, and slight variation in the aperture due to wear on die or tool.

In this fourth step a stretching tool 40, having an extended nose portion 42, may be used to stretch the walls of the socket to a predetermined depth prior to severing the collar 36 as the shank of the tool 40 passes through the aperture 32 or corresponding aperture in the die.

Figure 5:
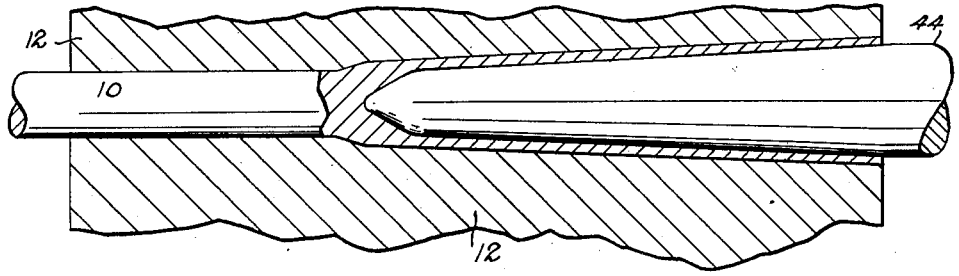

In case it is desired to form a tapered socket this may be accomplished in the manner shown in the fifth step in Fig. 5. The blank may be gripped in gripper dies as shown and a spreading or expanding tool 44 may be inserted in the socket, stretching it in diameter to the dimensions of the tool, as shown. By this means the wall thickness at the ends of the socket can be materially reduced.

Figure 6:
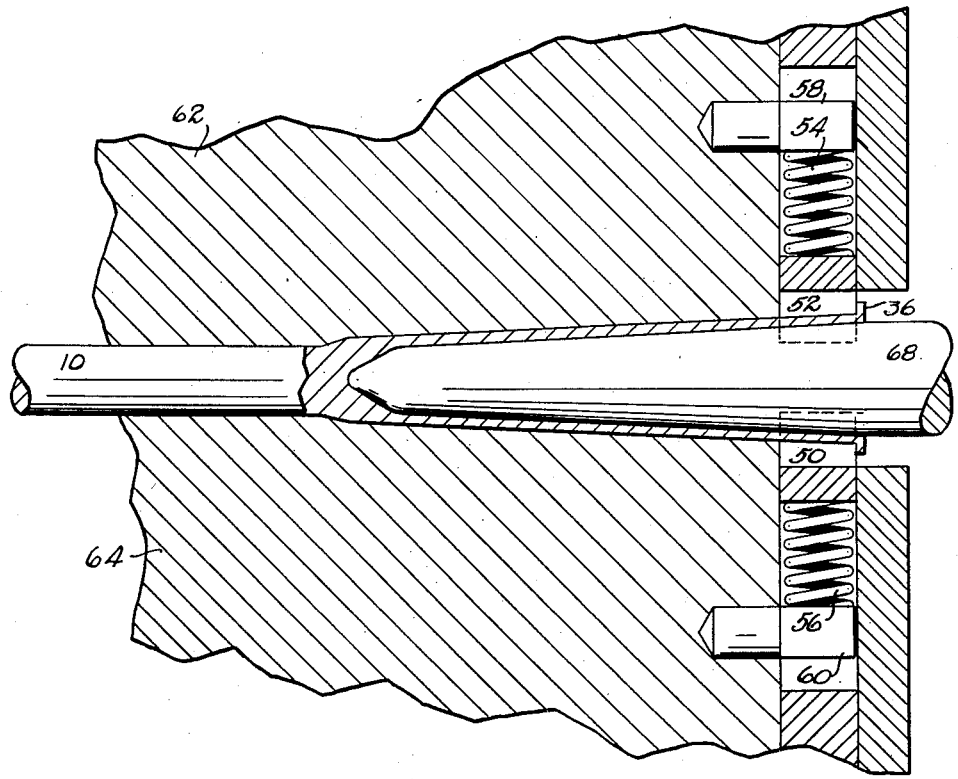

Another method of forming tapered sockets is illustrated in Fig. 6. As there shown, a pair of gripper dies 62 and 64 may have associated therewith movable flange holding members 50 and 52 normally urged toward each other by springs 54 and 56 reacting against lugs 58 and 60, respectively, which may be secured in the gripper dies 62 and 64, respectively.

An extruded thin-walled socket forging having a collar 36 may be then positioned in a die cavity in the gripper dies so that the holding members restrain the collar 36 from axial movement to the left. An expanding tool 68 may then be forced into the socket, causing it to expand to a predetermined size, the members 50 and 52 expanding outwardly therewith. The supporting of collar 36 prevents wrinkling of the walls or shortening of the socket.

Figure 7:
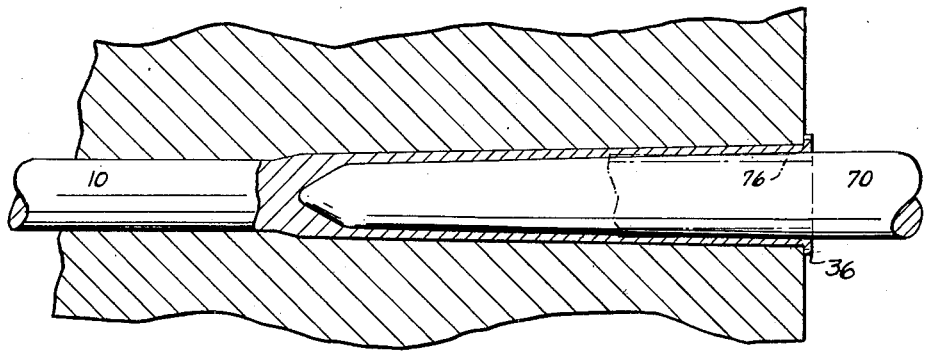
Figure 8:
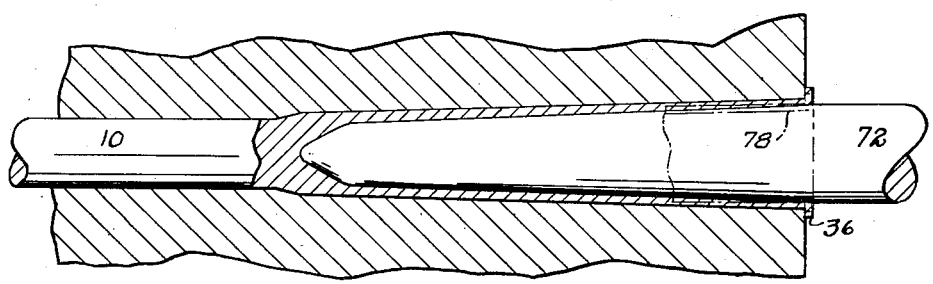
Figure 9:
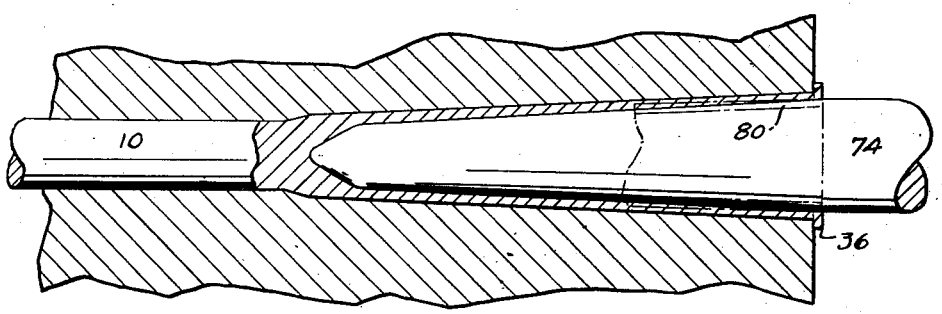

Another method of forming a tapered socket in a series of steps is indicated in Figs. 7, 8 and 9, which consist essentially of placing the socket forging in successive gripper dies, of such a bore that the collar 36 overlaps the walls of the die and is supported from slipping back, and forcing therein successively enlarged expanding tools 70, 72 and 74. The fragmentary outline of the socket in dot and dash lines, at 76, 78 and 80, indicate the socket as previously acted upon.

It will be apparent from the foregoing description and the illustrations in the accompanying drawings that I have produced a new method of extruding metal from forged or otherwise prepared blanks which consists principally in the forcing of a portion of the blank through an aperture concentrically of a forming or shaping tool by application of pressure on the portion of the metal to be extruded. Further, it will be seen that I have provided a method of producing straight side or tapered socket forgings of uniform length, either with or without a flange adjacent the mouth of the socket.

Figure 2:
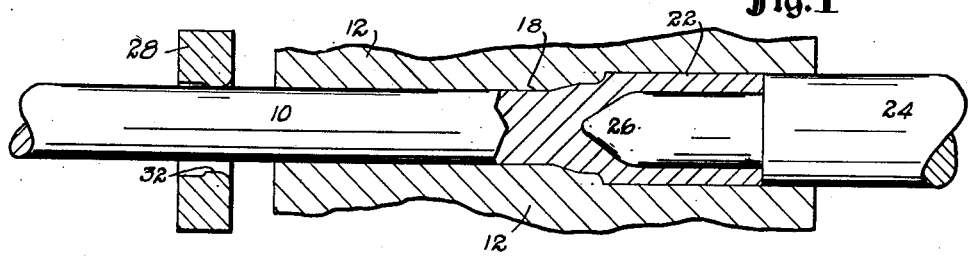
Figure 3:
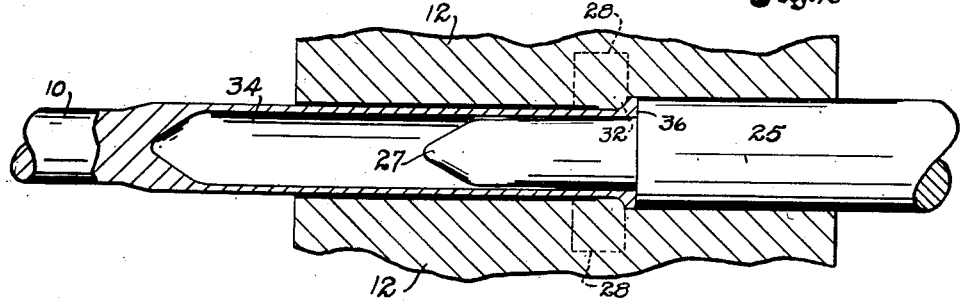
Figure 4:
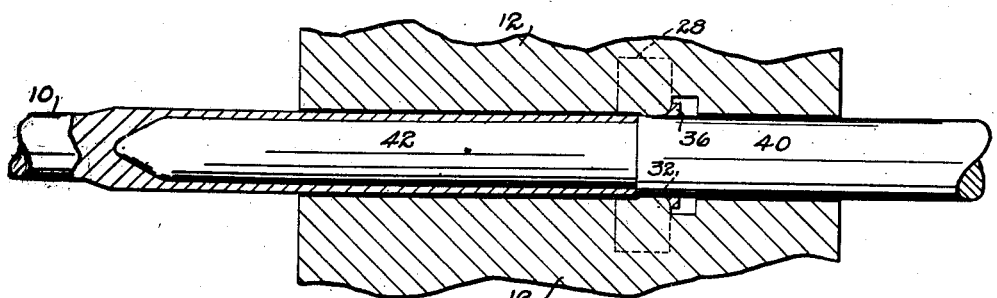

It will be obvious that variations may be made in either the steps used in the process illustrated and described or in the details of carrying out the process. For example, instead of upsetting a blank, as shown in Figs. 1 and 2, I may machine a blank from solid stock to the shape of that as upset in the operation in Fig. 2.

The blank may be made by any desired method, either machining from solid stock, drop forging or upset forging. A section of tubing might even be used, which would result in the thin walled piece being open at both ends. The hole through which the extrusion occurs need not necessarily be round, but could be square or hexagonal, if that were the shape desired for the outside of the blank.

Having thus described my invention, what I claim is:

1. A method of forming socket forgings which comprises substantially enlarging an end portion of parent bar stock, expanding the enlarged portion by pressure applied internally thereof, and thereafter extruding the expanded portion into an integral thin-walled socket by causing the parent stock to move away from the expanded portion through a restricted orifice by pressure on the expanded portion.

2. The method of forming socket forgings having sockets of definite depth which comprises enlarging one end of parent stock, expanding the enlarged portion to form a relatively thick-walled hollow section, positioning a forming tool in the hollow of the section, applying pressure to the edges of the formed relatively thick wall and forcing the wall through an orifice of a perimeter greater than that of the forming tool to cause the metal to move across the forming tool to form a relatively thin-walled hollow section terminating in a flanged portion, restraining the flanged portion, and applying pressure to the parent stock to elongate the relatively thin wall to a predetermined length.

3. The method of forming socket forgings having sockets of definite depth which comprises enlarging one end of parent stock, expanding the enlarged portion to form a relatively thick-walled hollow section, positioning a forming tool in the hollow of the section, applying pressure to the edges of the formed relatively thick wall and forcing the wall through an orifice of a perimeter greater than that of the forming tool to cause the metal to move across the forming tool to form a relatively thin-walled hollow section terminating in a flanged portion, restraining the flanged portion, applying pressure to the parent stock to elongate the relatively thin wall to a predetermined length, and subsequently severing the flanged portion from the relatively thin wall in the same operation.

4. The method of forming metallic thin-wall tubular sockets which comprises forming an enlarged tubular section integral with and at the end of parent stock, moving a forming tool into the hollow of the tubular section and simultaneously applying pressure on the tubular section away from the parent stock, and forcing the tubular section through an aperture having a perimeter less than that of the tubular section, the metal forced through the aperture flowing across the moving forming tool axially thereof to form an elongated tubular section, thereafter sizing the socket and shearing it from the remaining enlarged section.

5. The method of forming flanged tapered sockets integral with parent metal stock, comprising upsetting an end portion of the parent stock and enlarging and indenting the same, forming a socket therein by forcing the enlarged portion through an aperture embracing parent stock and having an enlarged recess fitting the enlarged portion, and forcing the material of the stock through this aperture while limiting the inward flow of the metal by an extension on the forming and forcing tool, thereafter subjecting the stock to tapered openings and tapered penetrating tools to elongate and enlarge the socket while retaining a portion of the original and enlarged socket as a flange.

WILLIAM W. CRILEY.